J. B. NELSON.
MOWER.
APPLICATION FILED JULY 22, 1920.
1,383,656.
Patented July 5, 1921.
2 SHEETS—SHEET 2.
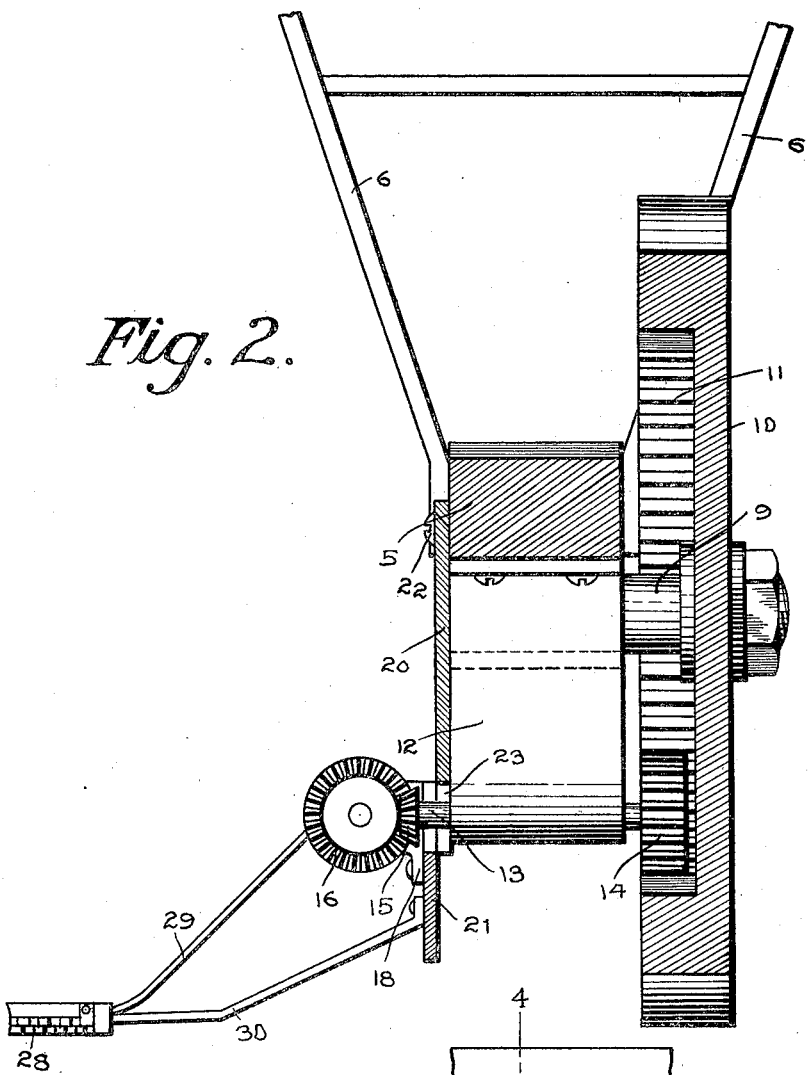
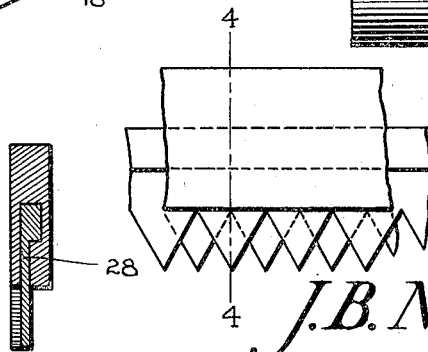
Inventor
J. B. NELSON

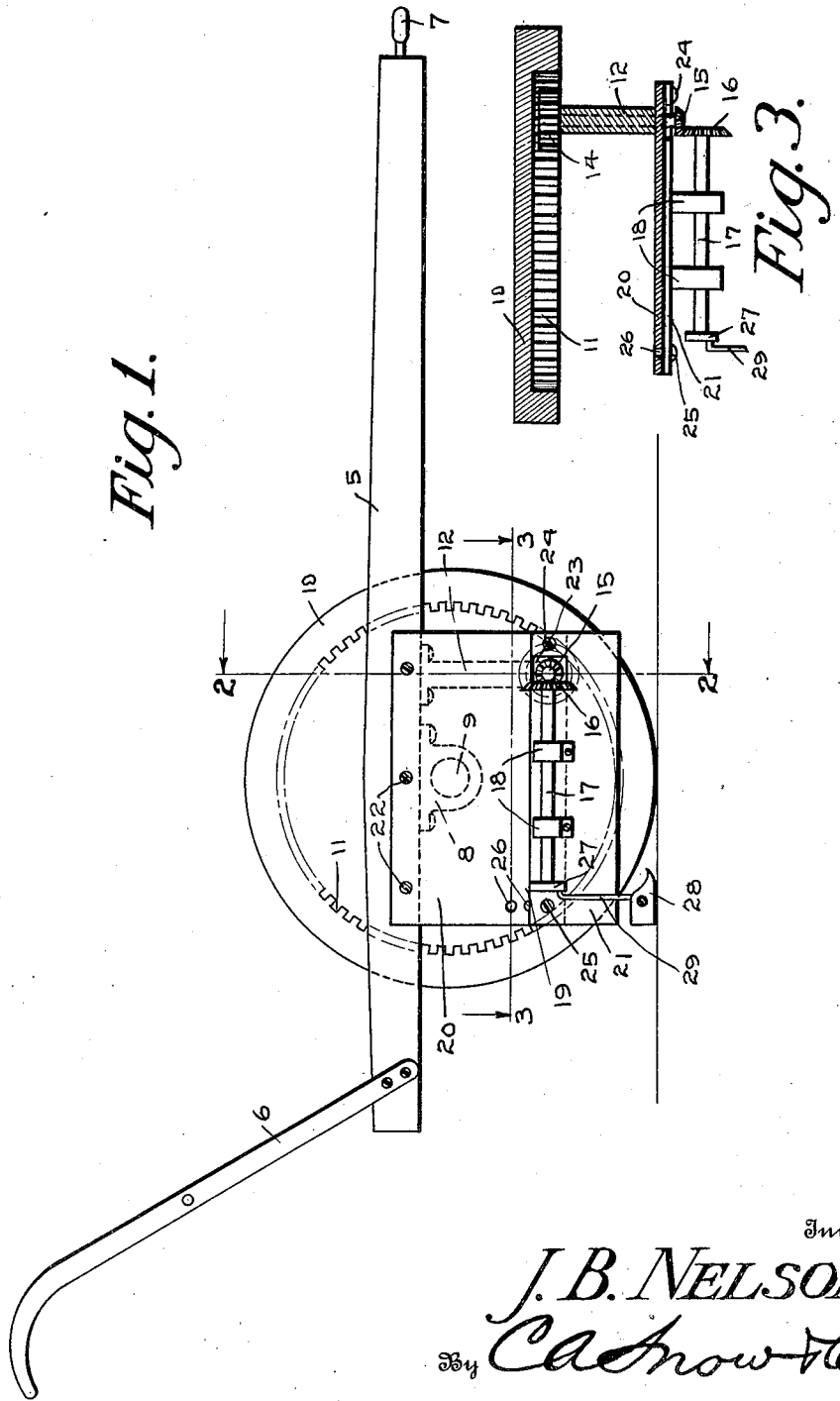

UNITED STATES PATENT OFFICE.

JOHN BRYON NELSON, OF JEFFERSON, TEXAS.

MOWER.

1,383,656.

Specification of Letters Patent.  Patented July 5, 1921.

Application filed July 22, 1920. Serial No. 398,073.

*To all whom it may concern:*

Be it known that I, JOHN BRYON NELSON, a citizen of the United States, residing at Jefferson, in the county of Marion and State of Texas, have invented a new and useful Mower, of which the following is a specification.

The present invention has reference to agricultural machinery, and more particularly to mowing machines, it being an object of the invention to provide a mower especially designed for use with a single horse.

A further object of the invention is to provide a device of this character wherein the sickle bar thereof may be adjusted with relation to the ground surface over which the device is operating, to mow the material under operation, at various heights.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of the invention, without departing from the spirit of the invention.

Referring to the drawings:—

Figure 1 is a side elevational view of a mower constructed in accordance with the present invention; Fig. 2 illustrates a sectional view taken on line 2—2 of Fig. 1; Fig. 3 illustrates a sectional view taken on line 3—3 of Fig. 1; Fig. 4 illustrates a sectional view taken on line 4—4 of Fig. 5; and Fig. 5 illustrates a fragmental plan view of the cutting blade.

Referring to the drawings in detail, the reference character 5 designates the mower beam which is provided with the handles 6, at one end thereof to be grasped by the operator to guide the machine, while the same is in operation, the forward extremity of the beam being provided with the usual clevis 7 by means of which the draft animal may be attached thereto.

Supported by the beam 5 is the bearing 8, which is the main bearing of the machine and supports the axle 9 therein, the axle 9 providing means for supporting the bull wheel 10 which is provided with the internal gears 11 that transmit power to the cutting mechanism of the machine, in a manner to be hereinafter more fully described.

A relatively long bracket indicated at 12, carries a bearing at the lower extremity thereof, and this bracket is also secured to the undersurface of the beam 5, the bearing end thereof terminating at a point in close proximity to the lower edge of the wheel 10 and supports the transversely extending shaft 13.

On this shaft 13 is mounted a pinion 14 which is constantly in mesh with internal gears 11 to receive rotary motion therefrom, the opposite extremity of this shaft supporting the beveled pinion 15 which is in mesh with a relatively large beveled pinion 16 carried on one end of the horizontal shaft 17, that operates in the bearings 18.

Carried by the machine, is a frame indicated at 19, and this frame includes an upper plate 20 and a lower movable plate 21, the upper plate being secured against movement as by means of the bolts 22 which pass through suitable openings in the plate 20, and are embedded in the beam 5. Adjacent to the lower forward end of the plate 20 is a relatively large opening 23 adapted to provide a clearance for the shaft 13, there being provided adjacent to the cut out portion, a pivot pin 24, by means of which the plates 20 and 21 are pivotally connected at one extremity thereof, the opposite ends being temporarily secured together as by means of the removable bolt 25, which passes through an opening in the plate 21.

A plurality of openings indicated at 26 are provided in the plate 20 and disposed in vertical spaced relation with each other to accommodate one end of the removable bolt 25 so that the bolt may be moved into any one of the openings, to adjust the rear edge of the plate 21 vertically, to cause the sickle bar supported thereby to operate in various positions of adjustment.

Secured to one end of the shaft 17, is an eccentric indicated at 27 which in turn supplies reciprocatory motion to the sickle bar 28 through the medium of the connecting rod 29. It might be further stated that the sickle bar is supported by means of the supporting bar 30, which has one extremity thereof connected to the lower plate 21, the opposite end thereof having connection with the sickle bar, in any well known manner.

From the foregoing it is obvious that a mower constructed in accordance with the present invention is comparatively light and may be operated with comparatively little power, the gearing being such as will transmit the maximum amount of power with the minimum amount of force. It is also obvious that by removing the bolt 25, and positioning the same in any one of the openings 26, the cutting bar or sickle bar may be adjusted to mow grass or the like, at various heights.

Having thus described the invention, what is claimed as new is:—

1. A mower comprising a mower beam, a bull wheel supported by the beam, a frame including an upper plate secured to the beam, a lower plate forming a part of the frame and having one end thereof pivotally connected to the upper plate, gearing carried by the frame, a sickle bar carried by the lower plate and adapted to receive motion through the gearing, and means at one end of the plates for permitting the lower plate to be adjusted vertically with relation to the upper plate.

2. In a mower, a beam, a bull wheel supporting the beam, a frame carried by the beam and including an upper stationary plate and a lower movable plate, means for connecting the plates, the upper plate having a plurality of openings disposed in spaced relation with each other, the lower plate having a bolt adapted to be positioned in a predetermined opening of the upper plate to adjust the lower plate with relation to the upper plate, a sickle bar carried by the lower plate, and means for transmitting motion from the bull wheel to the sickle bar.

In testimony that I claim the foregoing as my own, I have hereto affixed my signature in the presence of two witnesses.

JOHN BRYON NELSON.

Witnesses:
A. McKay,
J. H. Favrell.